United States Patent
Auld et al.

(10) Patent No.: US 7,722,924 B2
(45) Date of Patent: May 25, 2010

(54) COATED DISPLAY PIECES AND METHOD OF PRODUCING SAME

(75) Inventors: Daniel L. Auld, Columbus, OH (US); Charles E. Bree, Delaware, OH (US)

(73) Assignee: Auld Technologies LLC, Columbus, OH (US)

( * ) Notice: Subject to any disclaimer, the term of this patent is extended or adjusted under 35 U.S.C. 154(b) by 882 days.

(21) Appl. No.: 11/509,835

(22) Filed: Aug. 24, 2006

(65) Prior Publication Data

US 2007/0048528 A1    Mar. 1, 2007

Related U.S. Application Data

(60) Provisional application No. 60/711,031, filed on Aug. 24, 2005.

(51) Int. Cl.
*B05D 3/12* (2006.01)

(52) U.S. Cl. .................. 427/240; 427/384

(58) Field of Classification Search .................. 427/240, 427/384
See application file for complete search history.

(56) References Cited

U.S. PATENT DOCUMENTS

| | | | |
|---|---|---|---|
| 3,518,040 A | 6/1970 | Caldwell et al. | |
| 4,092,953 A | 6/1978 | Waugh | |
| 4,100,010 A | 7/1978 | Waugh | |
| 4,225,638 A | 9/1980 | Waugh | |
| 4,356,617 A | 11/1982 | Coscia | |
| 4,435,450 A | 3/1984 | Coleman | |
| 4,605,575 A | 8/1986 | Auld et al. | |
| 5,496,402 A * | 3/1996 | Sakamoto et al. | 106/287.16 |
| 5,648,149 A | 7/1997 | Rukavina et al. | |
| 5,939,188 A | 8/1999 | Moncur et al. | |
| 6,420,451 B1 | 7/2002 | Lin et al. | |
| 6,548,128 B2 | 4/2003 | Auld et al. | |
| 6,729,866 B2 | 5/2004 | Buazza et al. | |
| 2003/0152693 A1 | 8/2003 | Su et al. | |
| 2004/0106707 A1 | 6/2004 | Su et al. | |
| 2005/0045103 A1 | 3/2005 | Mikhael et al. | |

FOREIGN PATENT DOCUMENTS

WO    WO 2004/044265 A2    5/2004

* cited by examiner

*Primary Examiner*—Thao T. Tran
(74) *Attorney, Agent, or Firm*—Dinsmore & Shohl LLP

(57) ABSTRACT

Coated display pieces. Display pieces for electronic and mechanical displays are coated with a coating material coating. The coating helps to reduce or prevent breakage or shattering and/or to improve light transmission. Methods of making the coated display pieces are also described.

26 Claims, 1 Drawing Sheet

COATED DISPLAY PIECES AND METHOD OF PRODUCING SAME

STATEMENT OF RELATED CASES

This application claims the benefit of U.S. Provisional Application Ser. No. 60/711,031, filed Aug. 24, 2005, entitled Coated Display Pieces And Method Of Producing Same.

BACKGROUND OF THE INVENTION

The present invention relates to coated display pieces and the method of producing them and, more particularly, to windows for electronic and mechanical displays which have been coated with a coating material layer.

Electronic displays are devices used to exhibit electronically generated graphical and textual images. There are many different types of electronic displays, and many more are being developed. Among the more familiar types of electronic displays are: liquid crystal displays ("LCDs"); cathode ray tubes ("CRTs"); arrays of light-emitting diodes ("LEDs") or organic light-emitting diodes ("OLEDs"); plasma display panels ("PDP"); field emission displays ("FED"); and electroluminescent ("EL") displays. LCDs and EL displays are particularly useful in portable electronic devices due to their light weight and low power consumption relative to other display technologies.

Electronic and mechanical displays are used in a wide variety of products, including, but not limited to, cellular telephones; digital and analog watches; sports computers; monitors; electronic and mechanical displays for gauges, such as meters, liquid level indicators, pedometers, speedometers, odometers, tachometers, and the like; photographic devices, such as digital or film cameras, either still or video, light meters, electronic flash units, spectrometers, and the like; metrology devices, such as volt-ohm-millimeters, automotive diagnostic devices, telecommunications service devices, and the like; financial transaction devices, such as barcode scanners, automated teller machines, cash registers, and other scanning devices; security devices, such as retina scanners, fingerprint readers, and other biometric devices; and portable digital assistants (PDAs).

One option for windows for display devices is glass because it meets requirements for optical clarity and flatness, and it has good gas and moisture barrier properties and good electrical, mechanical, thermal, and chemical resistance properties. One advantage of glass is that, for a given plate thickness, it is less flexible than plastic, and so it can be much thinner than a plastic window of equal rigidity, and therefore it can be located closer to the display behind the window, allowing the product to be thinner. However, glass has a disadvantage in that it is more brittle than most common plastics, and is subject to breakage that can produce loose fragments. It is therefore of limited usefulness in many applications. Various plastics have been proposed as replacements for glass, often because they are lighter weight and more resistant to breakage than glass. Displays made with such plastic materials have been under development for years, but plastics have limitations which interfere with their performance. These limitations include unsatisfactory optical quality, flatness, scratch resistance, solvent resistance, thermal resistance, and liquid and gas barrier properties.

It is known to coat glass windows to protect them from breakage and environmental damage. Tough, thermoset polyurethane coatings and films exemplify one type of external transparent coating that has been used to protect glass from particle erosion, abrasion and breakage. See, for example, U.S. Pat. No. 5,939,188, which discusses such coatings and proposes an improved multilayer coating system which is said to be useful in aircraft transparencies or as windows for military ground vehicles. However, such multilayer coating systems are complex and require multiple deposition steps.

It is also known to coat glass containers with a layer of plastic, such as polyurethane, to prevent those containers, such as soft drink bottles, from shattering on impact. Thus, Waugh U.S. Pat. Nos. 4,092,953 and 4,225,638 disclose a method and apparatus for coating a glass container with a layer of plastic by rotating the container about its horizontal axis while a plurality of liquid applicator nozzles supply uncured plastic liquid to associated areas on the container. The container is also rotated during the subsequent curing of the plastic. However, such a system is only useful on cylindrical objects which can be rotated about a horizontal axis.

US Published Patent Applications 200401052693 and 20040106707 describe a method of pad printing a coating on an optical surface of an optical device. The coating includes at least one adhesion promoter selected from the group consisting of glycol ethers, glycol ether acetates, benzotriazole, a silane, and combinations thereof. It can also include at least one polymerizable material, and at least one polymerization initiator. The adhesion promoter is described as chemically etching, softening, or reacting with the outer surface of a substrate. However, the use of such an adhesion promoter complicates the coating formulation.

Accordingly, the need remains for coated display pieces and for a method of coating display pieces such as window displays for electronic and mechanical devices with a protective layer.

SUMMARY OF THE INVENTION

That need is met by the present invention which provides coated display pieces. In one embodiment, the coated display pieces include a display piece; and a coating material coating on the display piece, the coating material being free of an adhesion promoter.

In another embodiment, the coated display piece includes a display piece; and a unitary coating material on an upper surface and an edge of the display piece.

One method of coating a display piece for an electronic or mechanical device includes providing a display piece for an electronic or mechanical device; depositing a flowable coating material on the display piece; spinning the display piece on a vertical axis; and curing the flowable coating material to form the coated display piece for the electronic or mechanical device.

Another method involves coating an upper surface and an edge of a display piece for an electronic or mechanical device. The method includes providing a display piece for an electronic or mechanical device; depositing a flowable coating material on an upper surface of the display piece; spinning the display piece on a vertical axis so that the flowable coating material flows from the upper surface onto an edge of the display piece; and curing the flowable coating material to form a unitary coating on the upper surface and the edge of the display piece for the electronic or mechanical device.

DETAILED DESCRIPTION OF THE INVENTION

Figure 1:
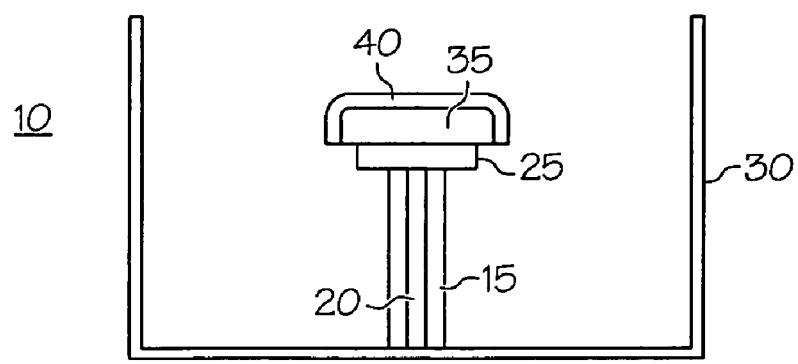
FIG. 1 shows a cross-section of one embodiment of an apparatus useful for spin coating the display piece.

The display piece of the present invention has a protective coating on one side (either one) or both sides (coated at the same time or in different steps). The protective coating can protect the piece against one or more problems, including, reducing or minimizing the chance of breakage, or reducing or preventing chipping, shattering, or fragmentation of a glass piece should it be broken, erosion, abrasion and other damage. Coated display pieces may have improved light transmission of the display. When the display piece is a plastic material, the coated display piece may also have improved scratch resistance.

The display pieces may be glass, plastic (e.g., polycarbonate, etc.), or ceramic pieces. The display pieces can serve functional or aesthetic purposes, such as windows for cell phones or other electronic or mechanical displays, covers. The display piece may be a window positioned over the electronic or mechanical display. Alternatively, the display piece may be the display itself, i.e., the coating may be deposited directly on the electronic or mechanical display.

Suitable coating materials include, but are not limited to, polyurethanes, epoxies, silicones, adhesives, rubbers, and acrylics. The coating materials can be in the form of liquids, powders, plasmas, slurries, gels, creams, pastes, and the like. The coating materials should be flowable under the particular application conditions being used. In one embodiment, the coating materials can be resilient to protect against chipping, shattering, or fragmentation.

One suitable coating material is an uncured polyurethane liquid plastic, which can be cured by various means, including, but not limited to, the application of heat, ultraviolet (UV) light, or infrared (IR) light. Suitable uncured polyurethane liquid plastics include, but are not limited to, two part polyurethanes, and single component polyurethanes of known types. An example of a suitable two part polyurethane is a mixture of "A" and "B" components of the type disclosed in U.S. Pat. No. 4,092,953, the disclosure of which is hereby incorporated by reference. Basically, it is a mixture of a polyether polyol component ("A"), which may be a difunctional, trifunctional and/or tetrafunctional polypropylene glycol containing a suitable catalyst, and a diisocyanate component ("B"), such as an aliphatic diisocyanate. The mixture of "A" and "B" components of this type cures through catalytic action, under heat such as produced by infrared or ultraviolet radiation. An example of a suitable diisocyanate is Hylene W from E. I. duPont de Nemours & Co., and an example of a suitable polyether polyol is one or more of the Pluracol materials (P-410 or TP-440) from BASF Wyandotte. It may also be a polyether-polyester polyol combination. The ratio of components A:B is preferably 50-60:40-50. A polyester polyol or polylactone polyol could be used in place of the polyether polyol.

Adhesion promoters are not necessary in the coating material, and are preferably not included.

After curing, the coating is preferably transparent or translucent. However, all or part of the coating may be tinted a color.

While coating already-sized individual display pieces is preferred, it is also possible to coat a larger sheet from which individual pieces are cut after coating.

The display piece can be cleaned using known cleaning methods, either before and/or after coating, if desired.

The display piece may optionally be primed before coating. Suitable primers include, but are not limited to, silanes. As an example, a mixture of approximately 2% castor oil (e.g., Surfactol from The Baker Castor Oil Co.) and up to approximately 2% silane (e.g., Dow 6020, 6040 or 6075 from Dow Corning Corp., which are respectively, 3-(2-aminoethylamine)propyltrimethoxysilane, glycidoxypropyltrimethoxysilane, and vinyltriacetoxysilane) in a solvent (e.g., 70% isopropyl alcohol and 30% acetone) may be used. Other known silane primers may also be used. The primer may be pre-applied by any suitable means, including, but not limited to, spraying or dipping. If desired, any solvent present can be removed by a suitable method, such as drying. Alternatively, the primer may be applied as a step in the coating process of the type described hereinafter.

The display piece can optionally be pre-conditioned. Pre-conditioning includes, but is not limited to, pre-heating or pre-cooling to a desired temperature, or pre-cleaning.

The coating material can be applied to the display piece using a number of suitable processes, including, but not limited to, dome coating and spin-coating. The deposition process can take place in a heated environment, if desired.

In a dome coating process, an orifice nozzle(s) is positioned above and proximal to the surface of the display piece to be coated. The uncured coating material is then deposited on the display piece. The uncured coating material flows to the edge of the display piece and stops, forming a meniscus. The coating material can then be cured. Dome coating processes are described in U.S. Pat. Nos. 4,100,010 and 4,356,617, for example.

A single orifice nozzle may be used as the fluid applicator for the uncured coating material. An example of a single nozzle applicator, and the fluid supply system associated with it, are shown in U.S. Pat. No. 4,100,010, the disclosure of which is hereby incorporated by reference. Alternatively, multiple nozzles may be used, depending on the mechanical properties of the display piece to be coated. A "suck-back" control system such as that described in U.S. Pat. No. 4,225,638, the disclosure of which is hereby incorporated by reference, may be used to prevent drippage, if desired.

In spin-coating, the display piece is rotated on a vertical axis to disperse the coating material across the surface. The centrifugal force created by the rotation causes the uncured coating material to flow radially toward (and usually beyond) the edge of the display piece. Careful control of the process may prevent the coating material from flowing over the edge of the display piece. Allowing the uncured coating material to flow beyond the edges of the display piece results in wasted coating material; however, this process may be easier to control than preventing flow beyond the edge of the display piece.

A shield (preferably disposable) can surround the rotating display piece to catch the excess coating material and to prevent it from interfering with other display pieces or moving parts. The shield can be a barrier of any shape or material, for example, generally cylindrical, conical, or frustoconical shape made of a plastic. It can have an open or closed top and/or an open or closed bottom. The top would preferably be open for easy access to the spindle, although it could be closed, if desired. The waste coating material can be collected, if desired. If the shield has a closed bottom, it could include a tube to allow the waste coating material to flow out for collection. There can be ventilation over the shield, if desired.

The display piece may be secured to the rotating apparatus, such as a spindle or turntable, by any suitable means, including, but not limited to, mechanical, or electro-mechanical means. For example, the display piece can be secured using a vacuum, a releasable adhesive, electromagnetics, static electricity, air pressure, or other fastening system. Vacuum systems provide an easy method for securing the display piece.

The display piece is preferably rotated by placing it on a rotatable spindle. In one embodiment, the interior of a hollow spindle on which the display piece is placed can be evacuated, which holds the display piece in place. Rotating the spindle with the display piece so secured spins the display piece to be coated.

There can be a leveling device on the top of the spindle, allowing the display pieces to be easily leveled when placed on the spindle. The spindles can be rotated at any appropriate speed, but generally speeds in the range of about 500 RPM to about 3000 RPM, typically about 600 RPM to about 2500 RPM, are known to be suitable. The spindles can be continually rotated, or they can be alternately rotated and stopped according to a specified cycle, for example, repetitively rotated for 5 seconds and stopped for 5 seconds. There can be a single spindle or multiple spindles, if desired. Multiple spindles can be arranged in any suitable way, including, but not limited to, an array, or in one or more circles.

After completing the dispensing and dispersing cycle, the coating material can be cured. A thermal cure is preferred, but any suitable curing method can be used, such as IR- or UV-curing. The coating material can be cured while the display piece remains in place. Alternatively, the coated display piece can be moved to a separate location for curing.

Prior to curing the coating material, the coated display piece can optionally be moved to a separate location to allow the uncured coating material (which may continue to flow slightly) to reach its final shape and thickness on the display piece before full curing takes place. During this "pre-cure" step, the display piece can be heated or otherwise treated, if desired, in order to affect the final results.

The display piece can optionally be rotated during the pre-cure, and/or curing step(s), if desired.

Any of the deposition, pre-curing, and/or curing steps can take place at a controlled temperature, if desired. The temperature can be held constant, or it can be varied during any step of the process. For example, any of the steps can take place in an oven in which the temperature can be controlled (either constant or varying). Post curing may also be desirable.

After curing, the coated display pieces can optionally be cooled, if desired.

The thickness of the coating is generally between about 0.0001 inch and about 0.15 inch and preferably from about 0.0005 inch to about 0.010 inch.

Interestingly, with the spin-coating process just described, the display piece need not be flat or planar. Rather, it may have curved portions, such as at one or more of the sides, and still be coated over the entire piece. This means that the display piece being coated may be of a compound or complex shape, rather than simply being flat. It may also be an assembly of pieces which not only serve as the display piece, but also as the body of the device, such as a cell phone.

Furthermore, when the display piece is spun, the coating material flows from the upper surface onto the edges of the display piece. Thus, the edges of the display piece can be coated at the same time as the upper surface. When the coating material is cured, a unitary coating is formed on the upper surface and edges of the display piece. The process does not require an additional step for coating the edges. The term "upper surface" means the surface being coated, whatever its orientation.

Figure 2:
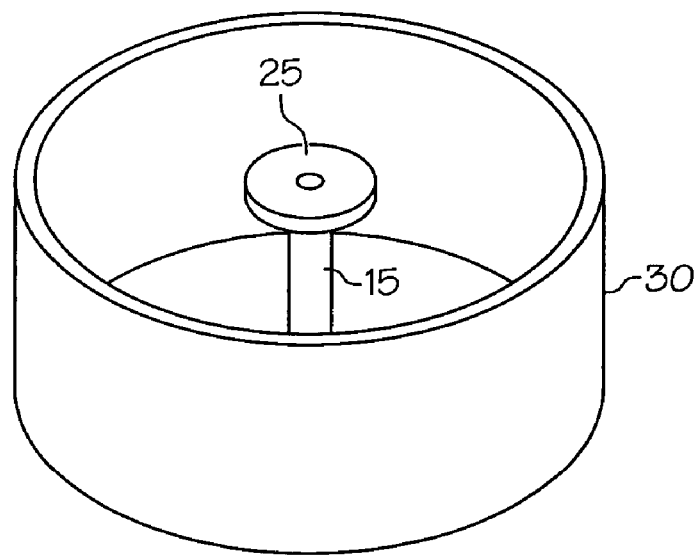
FIG. 2 shows a perspective of the embodiment of FIG. 1.

FIGS. 1 and 2 show one embodiment of an apparatus 10 which can be used to spin coat display pieces in accordance with the present invention. There is a spindle 15 with a hollow center 20 through which a vacuum can be drawn. There is a leveling device 25 attached to the spindle. The display piece 35 would be placed on the leveling device 25, and a vacuum drawn to hold the display piece in place. The coating 40 is deposited and cured on the display piece 35. A shield 30 surrounds the spindle 15.

Figure 3:
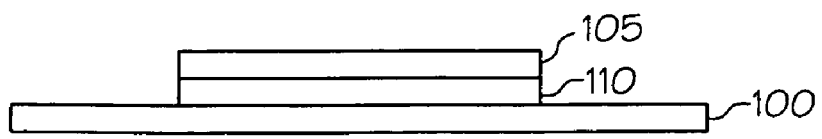
FIG. 3 shows one embodiment of a laminated display piece made using one embodiment of the process of the present invention.

The coating can be used to laminate two display pieces together, as shown in FIG. 3, if desired. A coating 110 can be applied to display piece 105. Display piece 105 with coating 110 can then be placed on display piece 100. The coating 110 can then be cured. One or both of the display pieces 100 and 105 can have a coating (not shown) applied to the opposite side either before or after being laminated. The display pieces 100 and 105 can be the same size or different sizes, depending on the application.

Example 1

Two (2) precleaned glass microscope slides were attached with double coated tape to spindles, and each was spun at approximately 800 RPM while an uncured polyurethane liquid was deposited onto the glass piece to a coating thickness of 0.002 inch. The polyurethane was then cured. A ball drop test showed that while the glass broke, all pieces remained essentially together.

Example 2

0.040×1"×1" glass slides were centrifugally cast with urethane. The thickness at the center was 0.002 inches, while at the edges it varied from 0.003 inches in the middle of the side to 0.004 inches at the corners.

A ball drop test was conducted and the glass shattered. However, all pieces remained essentially together. The ball drop was conducted under the following conditions:
 a) Ball diameter 0.656;
 b) Ball weight 18.9 grams;
 c) Dropped thru barrier 27¼ inches long
 d) Barrel 3" off drop zone
 e) Drop zone ⅜×6"×14"

For comparison purposes, a ball drop test was conducted on 3 glass slides 0.040×1×3 coated with Deco-chem by a screen print process rather than a spin coating one, with the following results:

"A" Slide 1 hit Deco-chem clear—shattered—pieces separated

"B" Slide wet dry Deco-chem clear—shattered—pieces separated

"C" Slide wet dry wet Deco-chem clear—shattered—pieces separated

| Screen Dry | | |
|---|---|---|
| 1 Hit | 1 | 1 |
| Wet Dry | 1 | 1 |
|  | 1 | 1 |
| Wet Dry Wet | 1 | 1 |
|  | 11 | 1 |

Example 3

Seven pieces of glass cell phone windows were cleaned with 99% alcohol (isopropyl) and then spin cast with uncured polyurethane liquid with 4 pulse shots for 4-5 sec. at 2500

R.P.M. and then platen cured at elevated temperature. The result was a relatively uniform coating of polyurethane on each.

Example 4

A fitting was attached to glass, and uncured polyurethane liquid was applied by spin cast for 1) 5 sec. on and 5 sec. off for 10 min. at 1-1500 R.P.M. to achieve a center thickness of approximately 0.001 inch; and 2) spin cast for 5 sec on and 5 sec. off for a limited time to produce heavier coat having a center thickness of approximately 0.002 inch.

Having described the invention in detail and by reference to specific embodiments thereof, it will be apparent that modifications and variations are possible without departing from the scope of the invention defined in the appended claims. More specifically, although some aspects of the present invention are identified herein as preferred or particularly advantageous, it is contemplated that the present invention is not necessarily limited to these preferred aspects of the invention.

What is claimed is:

1. A method of coating a display piece for an electronic or mechanical device comprising;
   providing a glass display piece for an electronic or mechanical device;
   applying a silane primer to the display piece
   spin coating a flowable coating material on the display piece, wherein the flowable coating material is deposited on an upper surface of the display piece with the silane primer and flows from the upper surface onto an edge of the display piece during spin coating, the flowable coating material selected from polyurethanes, epoxies, silicones, adhesives, rubbers, and acrylics, the spinning being on a vertical axis; and
   curing the flowable coating material to form the coated display piece for the electronic or mechanical device wherein the cured coating material forms a unitary coating on the upper surface and the edge of the display piece.

2. The method of claim 1 wherein the flowable coating material is deposited on the display piece before spinning the display piece.

3. The method of claim 1 wherein the flowable coating material is deposited on the display piece while spinning the display piece.

4. The method of claim 1 further comprising pre-conditioning the display piece before depositing the flowable coating material on the display piece.

5. The method of claim 1 further comprising heating the display piece while curing the flowable coating material.

6. The method of claim 5 wherein heating the display piece while curing the flowable coating material comprises varying a temperature of heating.

7. The method of claim 1 further comprising leveling the flowable coating material on the display piece before curing the flowable coating material.

8. The method of claim 7 further comprising heating the display piece while leveling the flowable coating material.

9. The method of claim 7 further comprising spinning the display piece while leveling the flowable coating material.

10. The method of claim 1 further comprising spinning the display piece while curing the flowable coating material.

11. The method of claim 1 wherein the display piece is rotated at speeds in a range of about 500 RPM to about 3000 RPM.

12. A method of coating an upper surface and an edge of a display piece for an electronic or mechanical device comprising;
    providing a glass display piece for an electronic or mechanical device; applying a silane primer to the display piece
    spin coating a flowable coating material on an upper surface of the display piece, wherein the flowable coating material is deposited on an upper surface of the display piece with the silane primer and flows from the upper surface onto an edge of the display piece during spin coating, the flowable coating material selected from polyurethanes, epoxies, silicones, adhesives, rubbers, and acrylics, the spinning being on a vertical axis, wherein the display pieces are alternately rotated and stopped;
    curing the flowable coating material to form a unitary coating on the upper surface and the edge of the display piece for the electronic or mechanical device wherein the cured coating material forms a unitary coating on the upper surface and the edge of the display piece.

13. The method of claim 12 wherein the flowable coating material is deposited on the display piece before spinning the display piece.

14. The method of claim 12 wherein the flowable coating material is deposited on the display piece while spinning the display piece.

15. The method of claim 12 further comprising pre-conditioning the display piece before depositing the flowable coating material on the display piece.

16. The method of claim 12 further comprising heating the display piece while curing the flowable coating material.

17. The method of claim 16 wherein heating the display piece while curing the flowable coating material comprises varying a temperature of heating.

18. The method of claim 12 further comprising leveling the flowable coating material on the display piece before curing the flowable coating material.

19. The method of claim 18 further comprising heating the display piece while leveling the flowable coating material.

20. The method of claim 18 further comprising spinning the display piece while leveling the flowable coating material.

21. The method of claim 12 further comprising spinning the display piece while curing the flowable coating material.

22. The method of claim 12 wherein the display piece is rotated at speeds in a range of about 500 RPM to about 3000 RPM.

23. The method of claim 1 wherein the display piece has a curved portion.

24. The method of claim 12 wherein the display piece has a curved portion.

25. The method of claim 1 wherein a thickness of the flowable coating material is between about 0.0001 inch and about 0.15 inch.

26. The method of claim 12 wherein a thickness of the flowable coating material is between about 0.0001 inch and about 0.15 inch.

* * * * *